United States Patent
Drabon et al.

(10) Patent No.: US 6,665,195 B1
(45) Date of Patent: Dec. 16, 2003

(54) CONVERTER APPLIANCE CAPACITOR ASSEMBLY

(75) Inventors: Rodscha Drabon, Neckarhausen (DE);
Manfred Zengerle, Ebertsheim (DE);
Johannes Scholten, Obrigheim (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 09/830,591

(22) PCT Filed: Oct. 26, 1999

(86) PCT No.: PCT/EP99/08089
§ 371 (c)(1),
(2), (4) Date: Jun. 5, 2001

(87) PCT Pub. No.: WO00/27020
PCT Pub. Date: May 11, 2000

(30) Foreign Application Priority Data

Oct. 29, 1998 (DE) .......................... 198 49 858

(51) Int. Cl.[7] .............................. H05K 7/12; H05K 7/14
(52) U.S. Cl. ................. 361/807; 361/709; 361/714; 361/717; 361/809; 361/810; 361/811; 361/820; 361/821; 361/830; 363/141; 363/147
(58) Field of Search ..................... 361/707, 709–711, 361/715, 717, 718, 734, 807–809, 811, 820–823, 825, 830, 831; 363/37, 79, 141, 144, 146, 147; 307/151, 154–156

(56) References Cited

U.S. PATENT DOCUMENTS

| 4,467,399 | A | * | 8/1984 | Van Husen | 361/676 |
|---|---|---|---|---|---|
| 5,365,424 | A | * | 11/1994 | Deam et al. | 363/144 |
| 5,623,399 | A | * | 4/1997 | Ishii et al. | 363/132 |
| 5,648,892 | A | * | 7/1997 | Wieloch et al. | 361/788 |
| 5,729,450 | A |   | 3/1998 | Dimino et al. | 363/132 |

FOREIGN PATENT DOCUMENTS

| DE | 42 32 763 A1 | 3/1994 | |
|---|---|---|---|
| DE | 44 12 407 A1 | 10/1995 | |
| DE | 196 28 549 A1 | 1/1998 | |
| DE | 197 17 550 A1 | 10/1998 | |
| DE | 198 13 365 A1 | * 11/1998 | H02M/1/00 |
| FR | 2 742 941 | 6/1997 | |

* cited by examiner

Primary Examiner—John B. Vigushin
(74) Attorney, Agent, or Firm—Howrey Simon Arnold & White, LLP

(57) ABSTRACT

The invention relates to a capacitor module for a converter. The capacitor module contains a capacitor which can be fastened to a base frame or to a cooling body by means of lateral, mechanical holding devices. In addition, the capacitor comprises at least one additional mechanical holding device for fastening at least one electronic terminal of the converter and of at least one measuring sensor, especially of a current transformer and/or of a voltage transformer. The inventive capacitor module makes it possible to realize a construction of a converter which is compact and has a reduced weight.

13 Claims, 3 Drawing Sheets

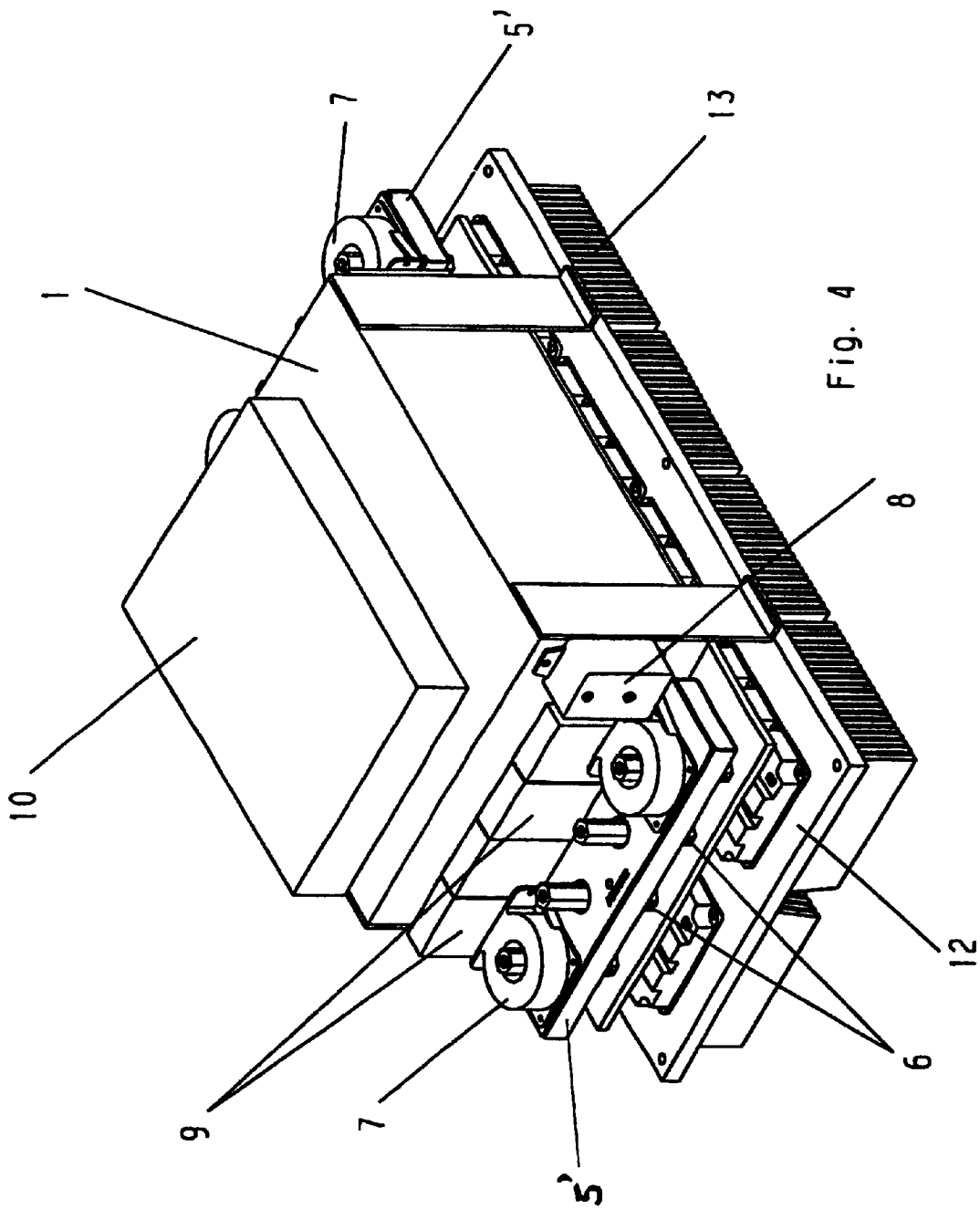

CONVERTER APPLIANCE CAPACITOR ASSEMBLY

DESCRIPTION

The invention relates to a converter appliance capacitor assembly which has at least one capacitor and can be attached by means of side mechanical holders to a base frame of the converter appliance or to a heat sink.

A capacitor assembly for a converter appliance has been proposed in German patent application P 198 13 365.0, in which a central, metallic multifunction housing part, which is connected directly to the heat sink of the power semiconductors, is connected to the capacitors such that it makes thermal contact. The driver circuits for the power semiconductors and the control and regulating arrangement of the converter appliance are located above the capacitors. These components are connected to the multifunction housing part via attachment devices required for this purpose. The multifunction housing part can be designed with or without a power busbar system.

A modular system for forming converter appliances of different power and with different types of cooling is known from DE 196 28 549 A1. In this case, a large number of individual capacitors are combined to form capacitor groups and are attached via holding plates to the cooler of the converter appliance.

A circuit arrangement for operation of at least one battery-powered electric motor in an industrial truck is known from DE 44 12 407 A1. In this case, at least one row of capacitors is arranged on a mounting body, which is connected to the cooler of a converter appliance.

A power converter having a capacitor assembly is known from U.S. Pat. No. 5,729,450. In this case, a large number of individual capacitors are attached by means of side holding plates to the frame of the converter. The electrical connections arranged on the front faces of the capacitors are connected to busbars.

The invention is based on the object of specifying a converter appliance capacitor assembly, which allows the converter appliance to have an extremely compact design.

This object is achieved by a converter appliance capacitor assembly which is designed as a load-bearing component of the converter appliance and has at least one front or side mechanical electrical connection and measurement sensor holder for making contact with external power connections, such as an electrical power supply and load connections.

The advantages which can be achieved by the invention are, in particular, that the proposed converter appliance capacitor assembly makes it possible to design a converter appliance such that space is saved, the weight is reduced and costs are reduced. Since the converter appliance capacitor assembly is itself designed as the load-bearing component of the converter appliance, there is no need whatsoever for the mechanical supporting and auxiliary frames which are normally generally used for converter appliances. A further advantage is that the converter appliance capacitor assembly can be disassembled for recycling.

One advantageous refinement of the invention is for at least one electronic circuit—preferably a drive circuit for power semiconductors—to be attached to the front mechanical holder. This embodiment assists the idea of the invention of allowing the capacitor assembly to be designed as compactly as possible.

The mechanical holder can be arranged at the front or side with respect to the capacitor. Depending on the spatial requirements, it may in this case be advantageous for a number of individual holders to be provided at the side of the capacitor. This means that the converter appliance capacitor assembly according to the invention can be used for a large number of spatial requirements.

The invention will be explained in more detail in the following text with reference to the exemplary embodiments which are illustrated in the drawing, in which:

FIG. 4 shows a perspective view of a further embodiment of the capacitor assembly according to the invention.

Figure 1:
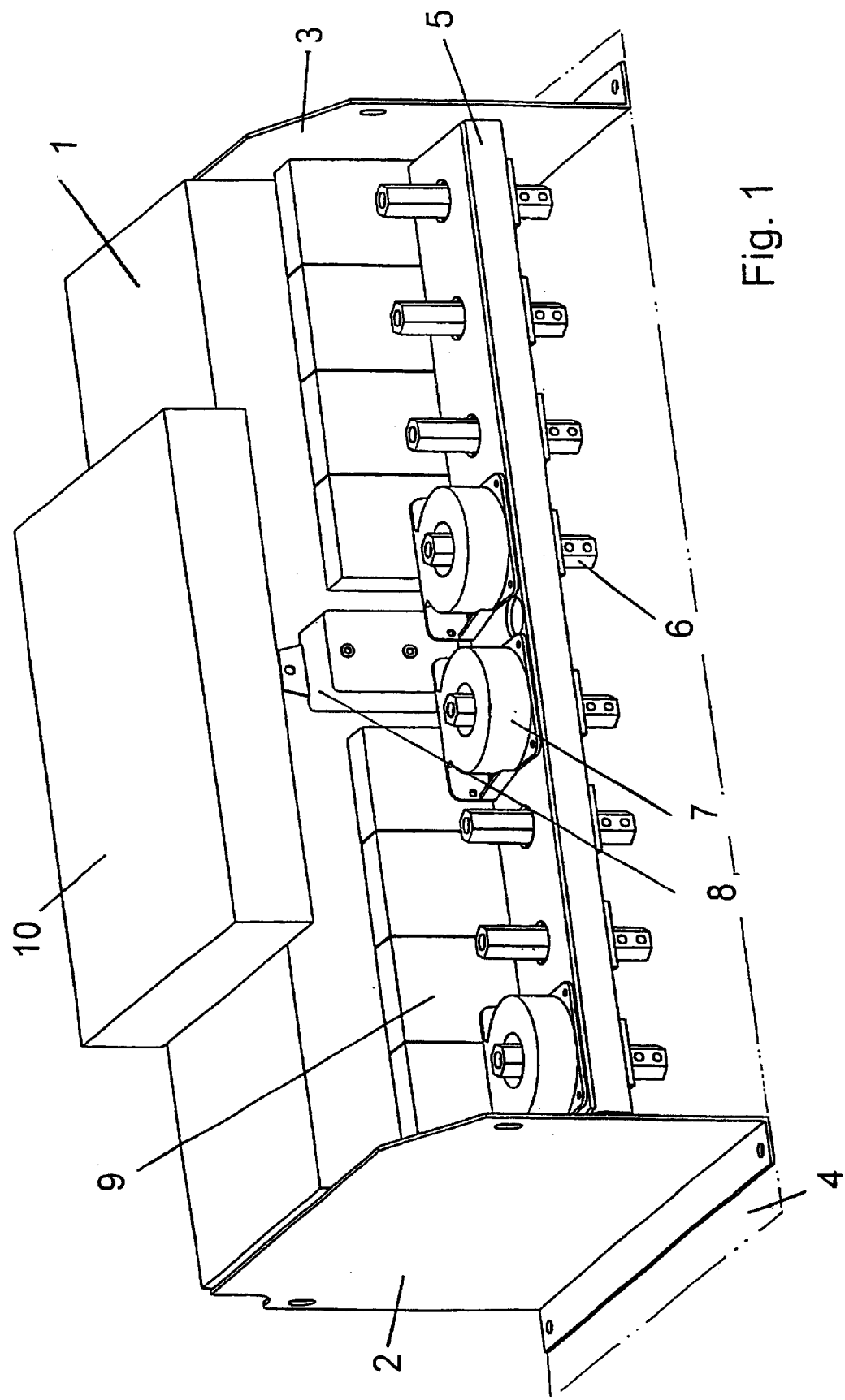
FIG. 1 shows a perspective view of a capacitor assembly according to the invention.

FIG. 1 shows a perspective view of a capacitor assembly. A cubic or cuboid capacitor 1 can be seen, which is connected to side mechanical holders 2, 3 on two opposite side surfaces. The capacitor may be integral, but it is also possible to combine a number of individual capacitors of smaller capacitance to form the capacitor with the desired capacitance. The two side mechanical holders 2, 3 are used for mounting the capacitor assembly on the base frame 4, for example on a heat sink (see item 12 in FIGS. 2 and 3). The capacitor 1 has a further, front mechanical holder 5, which extends on a face—from now on referred to as the front face—located between the mechanical holders 2, 3.

The front mechanical holder 5 of the capacitor assembly is used for attachment of electrical connections 6 (AC voltage connections, DC voltage connections) of the converter appliance and for attachment of measurement sensors in particular of three current transformers 7 and one voltage transformer 8. Furthermore, a number of electronic circuits 9 are attached to the front mechanical holder 5. These electronic circuits 9 are drive circuits for the power semiconductors of the converter appliance.

A further, flat electronic circuit 10 is attached to the top face of the capacitor assembly or of the capacitor 1, this being the control and regulating device for driving the power semiconductors.

Figure 2:
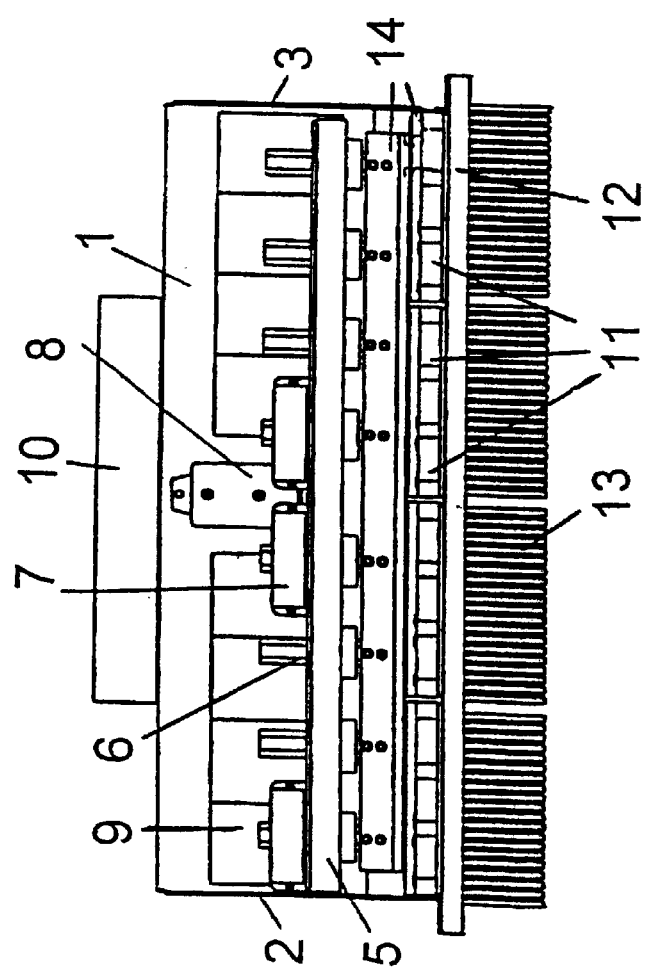
FIG. 2 shows a view of the front face of a converter appliance fitted with the capacitor assembly according to the invention.

FIG. 2 shows a view of the front face of a converter appliance fitted with the capacitor assembly. This shows that the capacitor 1 is mounted via the two side mechanical holders 2, 3 on a heat sink 12 to which a large number of power semiconductors 11, which are arranged side by side, are fitted. In the exemplary embodiment, this is a heat sink 12 which is fitted with cooling plates 13 and is suitable for air cooling. Liquid heat sinks can, of course, also be used.

The electrical connections 6 and current transformers 7 mounted on the front mechanical holder 5 are freely accessible on their top face in order to make contact with external power connections (electrical power supply, load connections), normally cable connections, and, on their bottom face, make contact with connections of a busbar system 14 within the appliance. The busbar system 14 provides the electrical connections for the individual power semiconductors 11 and, via a capacitor connection 15 (see FIG. 3) at the rear, the electrical connections for the capacitor 1.

Figure 3:
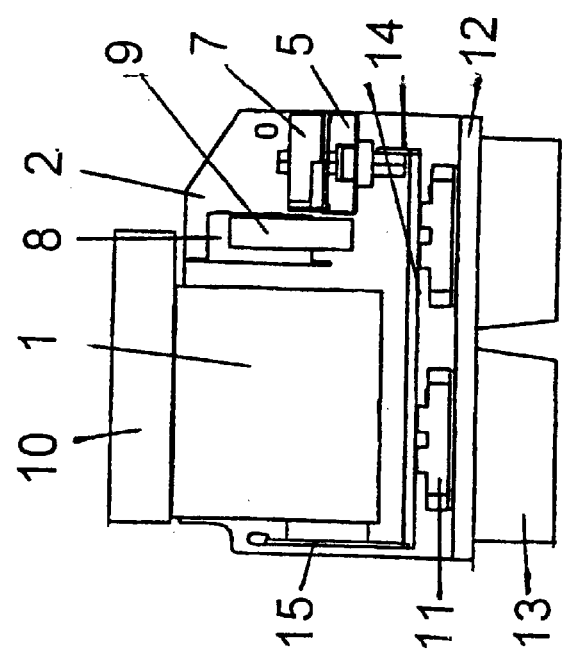
FIG. 3 shows a view of a side surface of a converter appliance fitted with the capacitor assembly according to the invention.

FIG. 3 shows a view of a side surface of a converter appliance fitted with the capacitor assembly. This shows the heat sink 12 with cooling plates 13, the power semiconductors 11 mounted in two rows on the heat sink 12, the capacitor 11 connected to the heat sink 12 via the side mechanical holders 2, 3, the front mechanical holder 5 with a current transformer 7 attached to it, the busbar system 14 and the rear capacitor connection 15. The side mechanical holder 3 has been removed in order to make it possible to see into the converter appliance.

FIG. 4 shows an embodiment of the capacitor assembly according to the invention, modified from that in FIGS. 1 to 3. In this case, two individual holders 5' are provided instead of the integral front holder 5 as shown in FIGS. 1 to 3. These are also used for accommodating the electrical connections 6 of measurement sensors, such as current transformers 7, and a voltage transformer. Furthermore, there are electronic circuits 9 in the region of these individual holders 5'.

List of reference symbols
1 Capacitor
2 Side mechanical holder
3 Side mechanical holder
4 Base frame
5 Front mechanical holder
6 Electrical connection
7 Current transformer
8 Voltage transformer
9 Electronic circuit (drive circuit for power semiconductors)
10 Electronic circuit (control and regulating device)
11 Power semiconductor
12 Heat sink
13 Cooling plates
14 Busbar system
15 Capacitor connection

What is claimed is:

1. A capacitor assembly for a converter appliance, comprising:
   a base unit comprising a base frame or heat sink;
   a capacitor having a front, a back, and two sides;
   two side mechanical holders for mounting the capacitor to the base unit, one side mechanical holder disposed on and connected to each side of the capacitor;
   at least one electrical connector for connection to an external circuit;
   at least one measurement sensor; and
   a front mechanical holder disposed at the front of the capacitor for attachment of the at least one electrical connector and measurement sensor,
      wherein the capacitor assembly is designed as a load-bearing component of the converter appliance.

2. The capacitor assembly as claimed in claim 1, further comprising one or more electronic power semiconductor drive circuits attached to the front mechanical holder.

3. The capacitor assembly as claimed in claim 1, wherein the capacitor has a top surface and further comprising a power semiconductor electronic control circuit attached to the top surface of the capacitor.

4. The capacitor assembly as claimed in claim 1, wherein the at least one measurement sensors comprise one or more current transformers.

5. The capacitor assembly as claimed in claim 1, wherein the at least one measurement sensors comprise a voltage transformer.

6. The capacitor assembly as claimed in claim 1, further comprising electrical connections on the back of the capacitor for connection to one or more busbars.

7. The capacitor assembly as claimed in claim 1, wherein the capacitor comprises a plurality of individual capacitors.

8. The capacitor assembly as claimed in claim 1, wherein the side mechanical holders comprise flat plates positioned substantially perpendicular to the base unit.

9. A converter appliance comprising:
   a capacitor assembly comprising:
      a base unit comprising a heat sink;
      a capacitor having a front, a back, and two sides;
      a front mechanical holder positioned at the front of the capacitor for attachment of electrical power connections; and
      two side mechanical holders for mounting the capacitor to the base unit, one side mechanical holder disposed on and connected to each side of the capacitor; and
      a plurality of electrical connections on the back of the capacitor;
   a plurality of power semiconductors connected to the heat sink; and
   a plurality of busbars connected to the power semiconductors and the electrical connections on the back of the capacitor.

10. The converter appliance as claimed in claim 9, further comprising one or more electronic drive circuits attached to the front mechanical holder for driving the power semiconductors.

11. The converter appliance as claimed in claim 9, further comprising one or more measurement sensors attached to the front mechanical holder.

12. The converter appliance as claimed in claim 9, wherein the capacitor comprises a plurality of individual capacitors.

13. The converter appliance as claimed in claim 9, wherein the side mechanical holders comprise flat plates positioned substantially perpendicular to the base unit.

* * * * *